US00RE36402E

United States Patent [19]

Williams et al.

[11] E Patent Number: Re. 36,402

[45] **Reissued Date of Patent: *Nov. 23, 1999**

[54] ELECTROLYTIC CELL ASSEMBLY AND PROCESS FOR PRODUCTION OF BROMINE

[75] Inventors: Ronald C. Williams; C. Donald Kettle, both of Clearwater; Earl E. Stebbins, Brooksville; L. Marshall McCullough, Belleair, all of Fla.

[73] Assignee: Ad rem Manufacturing, Inc., Orlando, Fla.

[ * ] Notice: This patent is subject to a terminal disclaimer.

[21] Appl. No.: 08/544,530

[22] Filed: Oct. 18, 1995

Related U.S. Patent Documents

Reissue of:

[64] Patent No.: 5,254,226
Issued: Oct. 19, 1993
Appl. No.: 07/878,682
Filed: May 5, 1992

[51] Int. Cl.[6] ..... C25B 1/24; C02F 1/467

[52] U.S. Cl. ..... 205/619; 205/618; 205/620; 205/742; 205/744; 204/228; 204/663

[58] Field of Search ..... 204/228, 663, 204/672; 205/618, 619, 620, 742, 744

[56] References Cited

U.S. PATENT DOCUMENTS

| | | | |
|---|---|---|---|
| 943,188 | 12/1909 | Hartman | 210/710 |
| 3,192,146 | 6/1965 | Vellas et al. | 204/240 |
| 3,305,472 | 2/1967 | Oldershaw | 204/268 |
| 3,351,542 | 11/1967 | Oldershaw et al. | 204/149 |
| 3,458,414 | 7/1969 | Crane et al. | 204/149 |
| 3,600,286 | 8/1971 | Sabins | 204/149 |
| 3,669,857 | 6/1972 | Kirkham et al. | 204/151.21 |
| 3,701,728 | 10/1972 | Appleman | 210/29 |
| 3,785,954 | 1/1974 | Herbert | 204/228 |
| 4,033,871 | 7/1977 | Wall | 210/96 R |
| 4,085,028 | 4/1978 | McCallum | 204/269 |
| 4,100,052 | 7/1978 | Stillman | 204/149 |
| 4,142,959 | 3/1979 | McCallum | 204/149 |

(List continued on next page.)

FOREIGN PATENT DOCUMENTS

| | | |
|---|---|---|
| 1673643 | 8/1991 | U.S.S.R. . |
| 1420197 | 1/1976 | United Kingdom . |
| 2092774 | 8/1982 | United Kingdom . |

OTHER PUBLICATIONS

CAPLUS abstract of SU 1673643 (E. G. Abramov), Aug. 30, 1991.

CAPLUS abstract of E. G. Abranov; "Elecrosorption extraction of bromine from oceanic water", Dokl. Akad. NAuk SSSR (1990), 313(3), 653–6, month unavailable 1990.

Kirk–Othmer Encyclopedia of Chemical Technology, 1979, 3rd Edition, vol, 8, pp.6710–680, (John Wiley and Sons).

*Primary Examiner*—Kathryn L. Gorgos
*Assistant Examiner*—Alex Noguerola
*Attorney, Agent, or Firm*—Allen, Dyer, Doppelt, Milbrath & Gilchrist, P.A.

[57] ABSTRACT

An easily installed, automatically operated sanitizing direct current, electrolytic cell canister assembly and a method or efficiently providing brominated water for swimming pools and the like, the method including furnishing d.c. power at a constant amperage to the bipolar electrode graphite plate electrolytic cell canister, controlling the flow of electrolyte through the canister, turning the d.c. current on and off to provide d.c. on/off switching, turning the d.c. power off, adjusting the time of the on/off switching so that the current is off for a predetermined selected time in a cycle of about 1 to 60 seconds, and, just prior to reversing the polarity of the electrodes, turning the power off for about five seconds, with separate polarity changing switching to help efficiently clean the graphite plates and keep the bromine atoms from going back to their ionized state and reduce any power surge due to the reversal of the polarity.

31 Claims, 2 Drawing Sheets

U.S. PATENT DOCUMENTS

| | | | |
|---|---|---|---|
| 4,255,246 | 3/1981 | Sweeny | 204/98 |
| 4,263,114 | 4/1981 | Shindell | 204/149 |
| 4,306,952 | 12/1981 | Jansen | 204/149 |
| 4,332,659 | 6/1982 | Spore | 204/237 |
| 4,492,618 | 1/1985 | Eder | 204/152 |
| 4,568,440 | 2/1986 | Sutter et al. | 204/268 |
| 4,714,534 | 12/1987 | Fair et al. | 204/269 |
| 4,781,805 | 11/1988 | Dahlgren | 204/149 |
| 4,917,782 | 4/1990 | Davies | 204/152 |
| 5,034,110 | 7/1991 | Glore et al. | 204/228 |

ELECTROLYTIC CELL ASSEMBLY AND PROCESS FOR PRODUCTION OF BROMINE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an electrolytic cell assembly for the production of bromine for providing brominated water for sanitizing a body of water such as a swimming pool or hot tub. The invention also relates to a process for producing bromine by the electrolysis of sodium bromide in an electrolytic cell.

2. Description of the Related Art

The production of a halogen, especially chlorine, in an electrolytic cell using bipolar electrodes or monopolar electrodes for sanitizing a body of water, especially swimming pools, is known. The Fair et al. U.S. Pat. No. 4,714,534 describe a monopolar electrode system and a bipolar electrode system, the patent being directed to the use of trapezoidal shaped electrode plates used in the monopolar electrode system.

The Sweeney U.S. Pat. No. 4,256,552 discloses a chlorine generator for the chlorination of a body of water. The generator uses bipolar electrodes.

The Davis et al U.S. Pat. No. 4,255,246 discloses an electrolytic cell and method of making hypochlorous acid from aqueous sodium chloride. An electronics control package is shown that is coupled to a source of alternating current and includes typically a rectifier and voltage regulator to provide for a constant but adjustable direct current output voltage across the electrodes of the electrolytic cell.

The Davies U.S. Pat. No. 4,917,782 shows an electrolytic cell including a cylindrical casing for housing a stack of electrode plates and mounting rings to maintain the plates in a fixed position.

The McCallum U.S. Pat. No. 4,142,959 (also related U.S. Pat. No. 4,085,028) is directed to an electrode assembly having bipolar electrode elements for use in producing chlorine. The assembly runs on a.c. current. It is indicated that the problem of unwanted deposits on the bipolar electrodes is reduced by controlling the electrolyte feed solution and by reversing the direction of current flow to the electrodes.

The Shindell U.S. Pat. No. 4,263,114 is directed to treating swimming pool water electrochemically. Shindell uses a.c. current, and rectifies it to apply a unidirectional d.c. current to a pair of electrodes. The method includes reversing the polarity of the energy applied to the electrodes, the feed water flowing past the electrodes. The feed water is, for instance, pool water to which sodium chloride has added to make it electrically conductive.

The Jansen U.S. Pat. No. 4,306,952 is directed to an electrolytic process for producing a halogen, including chlorine and bromine, using an electrolytic cell with bipolar graphite electrode plates. Jansen indicates that reversing the polarity of the plates will help to keep the electrode plates clean. Jansen discloses that the polarity should be changed every 80 to 330 minutes to obtain the benefits of the invention. Jansen uses an electrolytic cell assembly that has one permanent anode and two other anodes, one being a co-anode and the other being a cathode.

The above described patents, especially the McCallum patent and the Jansen patent are incorporated by reference for the description of what is old in the background of the invention.

Also incorporated by reference are pages 671–80, Vol. 8, Third Edition, Kirk-Othmer Encyclopedia of Chemical Technology, 1979, John Wiley and Sons. As therein stated, in discussing electrochemical processing, electrolytic cells, and the electrolysis of brine, cells are often designed with a stack of bipolar electrodes between monopolar feeder electrodes (anode and cathode). The bipolar electrodes are not electrically connected to the d.c. power supply but are polarized by the potential gradients in the cell. Generally, the bipolar anodes are polarized anodically on the side facing the feeder anode electrode and cathodically on the reverse side.

However, the prior patents and the Kirk-Othmer reference do not solve the problems of (1) removing unwanted deposits efficiently from bipolar graphite plates and (2) controlling the flow of electrolyte to provide an efficient flow rate through the cell.

OBJECTS OF THE INVENTION

An object of the present invention is to provide an electrolytic cell assembly using bipolar plates and a method of producing bromine from sodium bromide, in which the problems of removing unwanted deposits (mainly calcium carbonate) from the bipolar electrode plates and providing an efficient, yet effective flow of the sodium bromide through the plates, are alleviated and solved.

It is an object of the present invention to provide a process of producing bromine to sanitize a body of water and to provide an easy to use, efficient electrolytic cell canister for quickly installing in a swimming pool piping system, the canister producing highly beneficially bromine (compared to chlorine) and being economical (low in power consumption) and being environmentally safe.

It is an object of the present invention to provide an easily installed and easily used low cost environmentally safe electrolytic cell canister, the canister being used in a highly efficient and economical method for electrolyzing an aqueous electrolyte sodium bromide solution to produce bromine to provide brominated water for sanitizing a body of water, the method including passing the electrolyte through a canister having a compartment that houses electrodes that are an anode and a cathode and bipolar graphite electrode plate elements that are polarized anodically on one side, the method comprising the steps of:

(a) passing direct current through the aqueous solution in a bromine generator comprising the canister compartment and a plurality of the bipolar graphite plate elements positioned in the compartment with plate mounts to provide a circulation of electrolyte around the plate elements;

(b) turning the electrical power furnishing the direct current on and off;

(c) adjusting the time of the on/off switching in step (b), the current being off for a predetermined selected time in a cycle of about 1 to 60 seconds;

(d) reversing the polarity of the electrodes functioning as a cathode and an anode and the polarity of the bipolar graphite plates to remove deposits from the plate electrodes; and (e) delivering brominated water with a bromine content of about ½ to 7 parts per million for sanitizing a body of water.

BRIEF DESCRIPTION OF THE DRAWINGS

These and other objects will be apparent from the specification, the appended claims and the drawings, in which:

SUMMARY OF THE INVENTION

Figure 1:
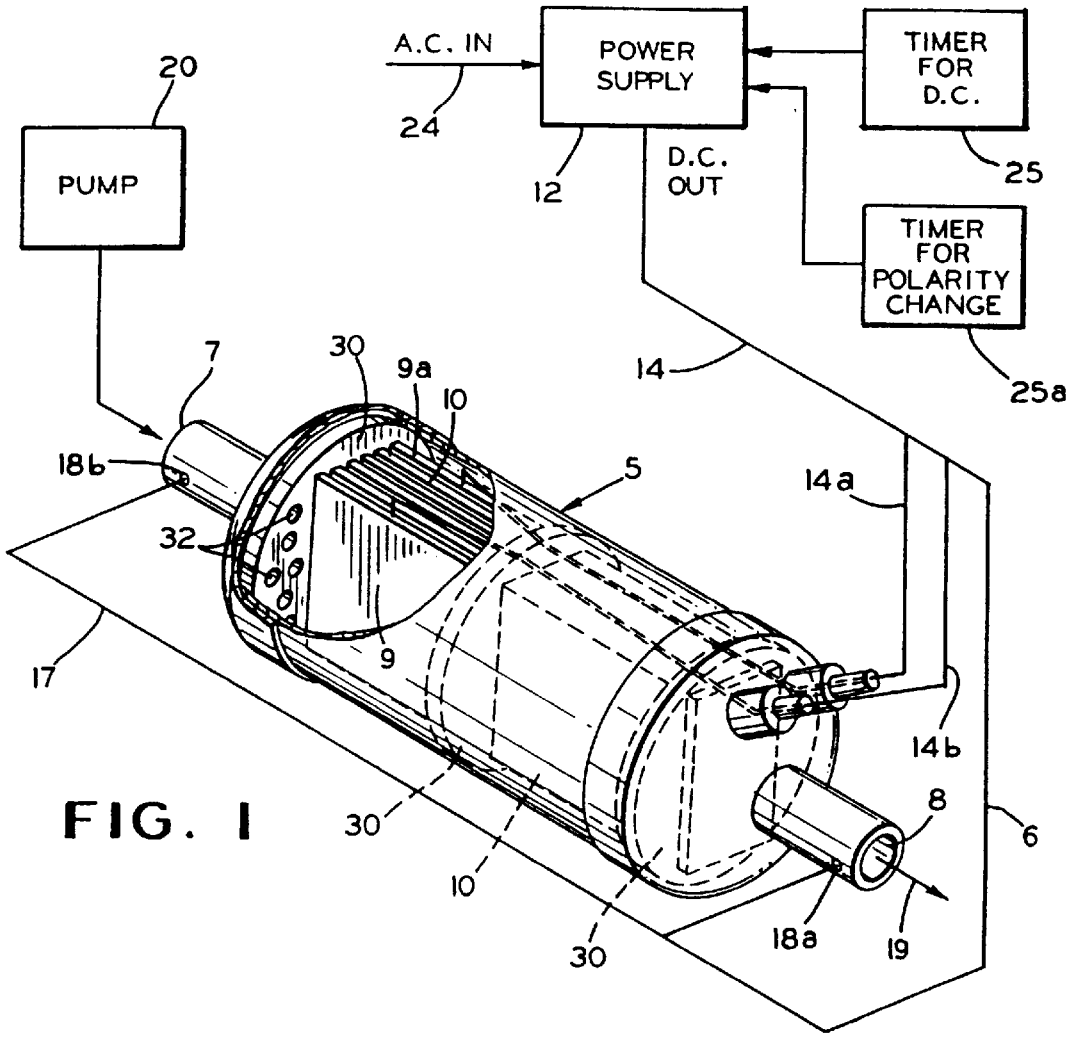
FIG. 1 is a schematic view of a bromination system showing a fragmentary perspective view of the electrolytic cell canister of the present invention.

The present invention provides a method for electrolyzing an aqueous electrolyte sodium bromide solution to produce bromine to provide brominated water for sanitizing a body of water; the method including passing the electrolyte through a canister having a compartment that houses an electrode that is an anode, a cathode, and bipolar electrode graphite plate elements, the method comprising the steps of:

(a) passing direct current through the aqueous solution in a bromine generator comprising the canister compartment and a plurality of the bipolar graphite plate elements positioned in the compartment with plate mounts to provide a circulation of electrolyte around the plate elements;

(b) turning the electrical power furnishing the direct current on and off;

(c) adjusting the time the power is off in the on/off switching in step (b), the current being off for a predetermined selected time in a cycle of about 1 to 60 seconds to aid in removing deposits from plate electrodes;

(d) reversing the polarity of the electrodes functioning as an anode and as a cathode to remove deposits from the plate elements; and (e) just prior to reversing the polarity of the current in step (d), turning the power off by polarity changing on/off switching, the power being off for about 3 to 8 seconds to help clean the electrode plate elements and help to keep bromine atoms from flipping back to their ionized state in response to the change in polarity and reduce any power surge; and (f) delivering brominated water for sanitizing a body of water.

The method preferably further includes the step of controlling the flow of electrolyte in the canister to within a range of about 3 to 6 feet per second by means of mounting plates for holding the bipolar electrodes, the plates having a plurality or apertures to provide a bypass for the water so as to regulate the flow of electrolyte around the electrode plates and through the plates for bromination. A flow between the electrode plate in the range of about 3 to 6 feet per second is helpful in cleansing the electrode plate of unwanted deposits.

The present invention also provides an easily installed, easily automatically operated, sanitizing electrode assembly apparatus for delivering brominated water to a body of water, the assembly comprising:

a canister having an inlet for an aqueous sodium bromide electrolyte and an outlet for brominated water, an anode and a cathode positioned in the canister and a plurality of bipolar electrode graphite plates separated from the anode and cathode with electrolyte, the anode and cathode electrodes connected to a direct current source, means for passing the electrolyte through the canister, means for applying direct current to the anode and cathode electrodes, means for reversing the polarity of the anode and cathode and the faces of the bipolar electrodes, and time adjustment on/off switching means for turning the direct current on and off during a selected predetermined cycle of about 1 to 60 seconds and preferably 1 or 2 seconds up to 9 or 10 seconds.

The assembly also preferably includes a polarity switching on/off means for turning off the power automatically for about 1 to 10 seconds, and preferably 3 to 8 seconds, just prior to reversing the polarity on the bipolar electrodes.

The process of the present invention and the electrolytic cell canister are safe, effective, care-free, economical and environmentally safe.

Compared to the use or chlorine, the use of bromine eliminates most of the unpleasant side effects such as odor, taste, dry skin and brittle hair. The use of bromine is effective in controlling algae and bacterial growth even at relatively high temperatures, chlorine being relatively ineffective as a sanitizing agent at temperatures above about 92° F.

The use of the method and canister of the present invention results in a care-free system, the flow of electrolyte beginning as soon as the pump is turned on and the power being delivered at a constant amperage which is turned on and off by the time adjustment on/off switching for a selected predetermined time (say, being off about 1 to 3 or 4 seconds every 10 seconds) within a cycle of preferably about 10 seconds. While the 10 second cycle is preferred, the cycle can be 20, 30, 40, 50 or 60 seconds. The off portion of the cycle is preferably 10 to 30 or 40 percent of the predetermined cycle, although the off portion can be up to 80 to 90 percent, or more, of the cycle.

The on/off switching of the power, periodic reversal of polarity, on/off switching just prior to the periodic reversal of polarity, and control of the rate of fluid flow between the electrode plates are all advantageous in preventing the build-up of unwanted deposits on the electrode plates.

The bromine producing canister and system of the present invention is economical, the equipment life being extended such as pump life and also easily maintained pool surfaces. The energy used, for producing 1 to 3 parts per bromine water, is generally less than the energy from a 100 watt light bulb.

The system and canister are environmentally safe, and no compounds are produced that will stain a pool or its equipment.

DETAILED DESCRIPTION OF PREFERRED EMBODIMENT

Figure 2:
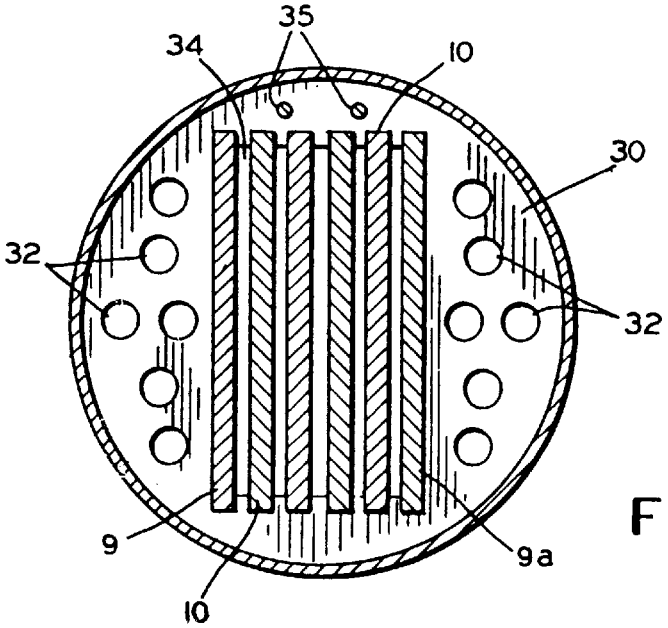
FIG. 2 is a sectional view of the graphite electrode plates positioned within the canister and held with a mounting plate with flow control apertures.

As seen in the drawings, there is provided a sanitizing electrode assembly apparatus for delivering brominated water to a body of water, the assembly comprising a canister 5 having an inlet 7 for art aqueous sodium bromide electrolyte, preferably from a swimming pool, and an outlet 8 for brominated water. As seen in FIGS. 1 and 2, there is an anode 9 and a cathode 9a positioned in the canister and a plurality of bipolar electrode graphite plates 10 separated from the anode and cathode and front each other will the electrolyte. The anode and the cathode electrodes are connected to a direct current source 12, by wires 14, 14a and 14b and wires 6 and 17 are connected to grounds 18a and 18b. There is provided means for passing the electrolyte through the canister, including a typical circulating pump 20, there preferably being a typical filter (not shown) and an electrically operated on-off flow switch mounted in the feedline between the circulating pump 20 and the inlet of the canister 5. The filter generally helps provide clean electrolyte for flowing through the canister.

The delivery of brominated water to a body of water, preferably a swimming pool, follows the direction of the arrow 19. A typical a.c. power source is used, the a.c. current being rectified to provide a direct current power supply for the electrode. The assembly has means for applying direct current to the anode and bipolar electrode, and means for reversing the polarity of the bipolar electrodes at given intervals to help clean unwanted deposits (principally calcium carbonate) from the graphite plates 10. It is advantageous in this regard to change the polarity at intervals of from about 3 to about 10 minutes.

The assembly has power control timing means 25 for turning the direct current on and off including timing adjust means for determining the percentage of time the Unit is off during each cycle. Each cycle is between from about 1 to about 60 seconds, and is preferably about 10 seconds. The on/off timing allows the user to control the rate of bromine generation as well as aiding in the cleansing of the electrode plates.

The apparatus includes polarity changing on/off switching means 25a for turning the power off about generally 1 to 10 seconds, and preferably 3 to 8 seconds just prior to reversing the polarity of the anode and cathode and the polarity of the faces of the bipolar electrodes 10. This short shut-off time is highly advantageous for cleaning the plates 10 and providing an efficient electrolyte cell.

As seen in FIG. 2, the apparatus also has means for controlling the flow of electrolyte through the canister including mounting plate means 30 for the bipolar electrodes and apertures 32 in the mounting plate means to regulate fluid velocity at 3 to 6 feet per second and provide an efficient flow, between the bipolar electrode 10. Thus, fluid passing through apertures 32 bypasses bipolar electrodes 10. As best seen in FIGS. 1 and 2, the apparatus shown has the mounting plate means 30 that comprises three (two would suffice) mounting plates, each plate having a plurality of apertures 32 to control the flow of electrolyte. The graphite plates 10 are held in place by the mounts 30, the walls of the canister preferably being transparent to show the interior of the canister. The mounts have small holes 35 for wires 14a, 14b carrying d.c. power to the feeder anode and cathode.

Figure 3:
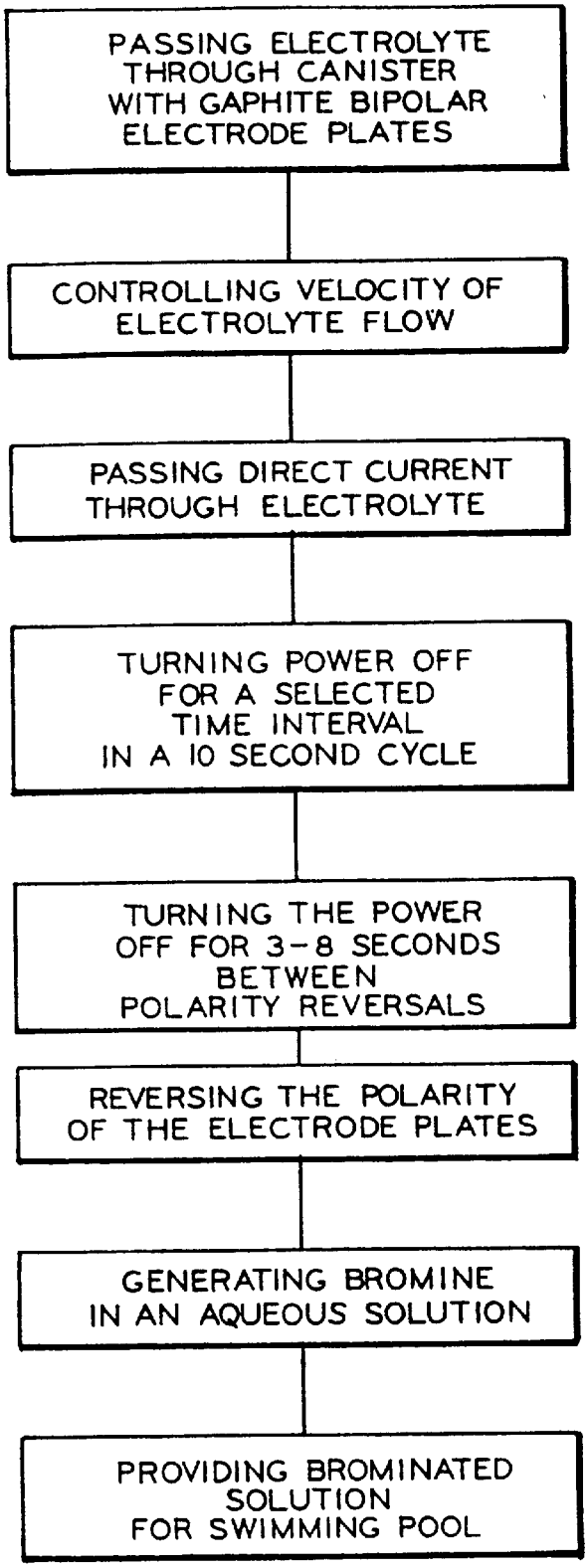
FIG. 3 is a flowsheet illustrating the efficient, low-cost method of tie present invention.

A preferred method of the invention is illustrated in the flowsheet of FIG. 3, the method including passing the sodium bromide electrolyte (such as from a swimming pool) through the electrolytes cell canister having an anode 9, a cathode 9a, and bipolar electrode graphite plates 10. One of the improvements in the present method is in controlling the flow of electrolyte around the graphite plates. As seen in FIG. 3, the outstanding method steps (a) passing direct current to an anode and cathode and through the aqueous solution in a bromine generator comprising the canister compartment, a plurality of the bipolar graphite plate elements positioned in the compartment with plate mounts with apertures to provide a circulation of electrolyte around the plate elements;

(b) controlling the flow of electrolyte around the graphite plate, with about 2 to 20 holes, and preferably 8 to 14 holes, on each side of the mount;

(c) turning the electrical power furnishing the direct current on and off to stop the electrolyte treatment for a predetermined time in a cycle of about ½ to 10 seconds; the predetermined off time being dependent upon the amount of bromine generated as desired by the operator;

(d) reversing the polarity of the bipolar electrodes functioning as in anode on one side and a cathode on the other side to help remove deposits from the plate electrodes;

(e) just prior to reversing the polarity of the current in step (d), turning the power off for generally about 3 to 8 seconds and preferably about 5 seconds to help clean the electrode plate elements and help to keep bromine atoms from flipping back to their ionized state in response to the change in polarity and prevent a surge of current; and (f) delivering brominated water from the electrolyte cell for sanitizing a body of water.

As indicated, the d.c. power delivered to the electrode is with constant amperage and efficiently uses both halves of the sine wave curve. Previously, generally only one-half or the curve was used and the amperage was varied. A bromine rate switch means has a low power setting for an economical normal bromine rate production of say, 1 to 3 ppm bromine water, in which only one-half of the sine curve (power train wave) is used. The rate switch, when on a high setting, delivers, say, 5 to 6 ppm bromine water at about double the power of the low setting.

In general, the canister size is matched to the pump and the flow rate adjusted and controlled with apertures in the mount plates.

As seen in the drawings, the canister with the graphite electrode plates is easy to use and consumes a small amount of power. The graphite plates for use in commercial applications are generally use with about a 3/16" gap, while plates used in residential applications are used with about a ⅛" gap. The graphite plate assembly for one unit generally has 4 to 8 bipolar graphite plate electrodes and generally unipolar electrodes along the lines shown in FIGS. 1 and 2 of the previously discussed McCallum U.S. Pat. No. 4,085,028.

As seen in FIGS. 1 and 2 of the drawings of this invention, the bipolar electrode assembly usually has four to eight graphite electrode plates held within the canister with a gap 34 of ⅛" or more as seen especially in FIG. 2.

The a.c. current is usually 110 volts, 60 hz and 15 amps although 200 volt current can be used. The d.c. output current is about 1 to 30 amps and preferably 2 to 8 amps, depending upon the concentration of the sodium bromide solution. The d.c. output voltage is about 20 to 90 volts and preferably about 30 volts. Occasionally, the build-up of calcium carbonate can be removed easily with HCl, the plates cleaning up in only 3 to 4 minutes, compared to 30 minutes or more prior to the present invention.

What is claimed is:

1. A method for electrolytically producing bromine from an aqueous electrolyte bromide solution to provide brominated water for sanitizing a body of water, the method comprising:

(a) pumping the bromide solution through an electrolytic cell, said electrolytic cell including a canister having a compartment that houses two electrodes functioning as an anode and a cathode, and a plurality of bipolar planar electrode plates in spaced-apart relationship between the anode and the cathode and parallel to a flow of the bromide solution moving from an input end of the canister, across the electrode plates, and out an output end of the canister;

(b) supplying a direct current from a power supply to the electrolytic cell in an adjustable operating cycle controlled by a DC power timer, the operating cycle being 60 seconds or less in length and defined by connecting the power supply to the anode and cathode for up to 90% of the cycle and by disconnecting the power supply from the anode and cathode for the balance of the operating cycle, the direct current from the power supply establishing a polarity at the anode and cathode and passing through the bipolar electrode plates and the aqueous solution in the electrolytic cell to produce brominated water;

(c) directing the brominated water from the canister to the body of water for sanitizing the body of water;

(d) reversing the polarity of the electrodes functioning as the anode and the cathode in an adjustable polarity cycle controlled by a polarity timer, the polarity of the anode and the cathode being switched every 3 to 10 minutes, which results in the bipolar electrode plates alternatively functioning as an anode on one face and as a cathode on the other face;

(e) overriding the DC power timer to disconnect the direct current power supply from the anode and the cathode for approximately 3 to 10 seconds prior to the reversing of the polarity of the electrodes, and then returning to the operating cycle;

(f) monitoring the bromine content of the brominated water and the build-up of a deposit on the electrodes; and (g) adjusting the DC power timer to control the operating cycle and adjusting the polarity timer to control the polarity cycle and override, whereby brominated water with the desired bromine concentration is supplied to the body of water and the build-up of the deposits on the electrodes is eliminated.

2. A method as defined in claim 1 in which the operating cycle in step (b) is about 1 to seconds.

3. A method as defined in claim 1 in which the direct current is supplied at a constant amperage.

4. A method as defined in claim 1 in which there is a further step of controlling the flow of the bromide solution to provide an efficient flow velocity of about 3 to 6 ft./second through the electrode plates.

5. A method as defined in claim 1 in which the direct current is supplied at a constant amperage, the amperage selected to provide the brominated water with a bromine content of about 1 to 9 parts per million.

6. The method as defined in claim 1 in which there is a further step of controlling the flow of the bromide solution through a pair of mounting plates in the canister and across the electrodes supported by the mounting plates, by directing a portion of the flow through a set of side apertures in the mounting plates.

7. A method as defined in claim 1 in which a sodium bromide electrolyte used and the operating cycle is approximately 10 seconds, and includes being connected to the power supply for 7 seconds and being disconnected from the power supply for 3 seconds.

8. A method as defined in claim 7 in which an override cycle occurs approximately 5 seconds prior to the reversing of the polarity of the anode and cathode.

9. A method as defined in claim 1 in which there is a further step of selecting a low power setting for bromine production of 1 to 3 parts per million or a high power setting for bromide production of 4 to 6 parts per million.

10. A sanitizing electrode assembly apparatus for delivering brominated water to a body of water, the assembly comprising:

(a) a canister having an inlet for an aqueous bromide electrolyte and an outlet for brominated water;

(b) in anode and a cathode positioned in the canister and a plurality of bipolar electrode plates in spaced-apart relationship between the anode and the cathode and parallel to a flow of the electrolyte from the inlet, across the electrode plates, and out the outlet;

(c) means for passing the electrolyte through the canister;

(d) power supply means for selectively supplying a direct current from a direct current source to the anode and cathode, and for establishing a polarity for the anode, the cathode, and the bipolar plates;

(e) a first control means for determining an operating cycle for said power supply means, said first control means provided with adjustable timers for establishing the operating cycle, including an adjustable time period during which the power supply means is connected to the anode and the cathode and an adjustable time period during which the power supply means is disconnected.

(f) a second control means for reversing the polarity of the anode and the cathode, which reverses the polarity for the bipolar plates, said second control means including an adjustable timer for establishing an independent polarity cycle time and an override means for selectively disconnecting the power supply means from the anode and the cathode prior to reversing the polarity of the anode and the cathode.

11. An apparatus as defined in claim 10 wherein the override means includes a timer switch for disconnecting the power supply means from the anode and the cathode for about 1 to 10 seconds prior to reversing the polarity of the anode and cathode.

12. An apparatus as defined in claim 10 including means for controlling the flow of electrolyte through the canister, said means for controlling the flow including being mounted in said canister for supporting the bipolar electrode, the mounting plate means being provided with a plurality of side apertures for directing a portion of the flow of the electrolyte around the bipolar electrode plates to provide en efficient flow for the electrolyte passing through the electrodes for bromination.

13. An apparatus as defined in claim 12 wherein the mounting plate means comprises at least two plates, each plate having a plurality of apertures to provide a bypass for the flow of electrolyte and to control the flow of electrolyte through the electrodes for bromination.

*14. A method for electrolytically producing bromine from an aqueous electrolyte bromide solution to provide brominated water for sanitizing a body of water, the method comprising the steps of:*

*pumping the bromide solution through an electrolytic cell, the electrolytic cell including a canister having a compartment that houses two electrodes functioning as an anode and a cathode, the bromide solution moving from an input end of the canister, across the electrodes, and out an output end of the canister;*

*supplying a direct current from a power supply to the electrolytic cell in an opening cycle comprising a first time period wherein the power supply is connected to the anode and the cathode and a second time period wherein the power supply is disconnected from the anode and the cathode, the direct current from the power supply establishing a polarity at the anode and the cathode and passing through the aqueous solution in the electrolytic cell to produce brominated water, the brominated water for sanitizing the body of water;*

*reversing the polarity of the electrodes functioning as the anode and the cathode in a polarity cycle, the polarity of the anode and the cathode being switched in a cycle time; and*

*overriding the operating cycle to disconnect the direct current power supply from the anode and the cathode for a period prior to the reversing of the polarity of the electrodes, and then returning to the operating cycle, wherein the overriding step is for preventing buildup of unwanted deposits on the electrodes.*

*15. The bromine producing method recited in claim 14 wherein the canister further comprises a bipolar electrode plate positioned between the anode and the cathode; and*

*the reversing step results in the bipolar electrode plate alternatively functioning as an anode on one face and as a cathode on the other face.*

*16. The bromine producing method recited in claim 15, wherein the anode, the cathode, and the bipolar electrode plate are positioned parallel to the movement of the bromide solution from the input end to the output end of the canister.*

*17. The bromine producing method recited in claim 16, wherein the bipolar electrode plate comprises a plurality of bipolar electrode plates positioned in spaced apart relationship to each other.*

*18. The bromine producing method recited in claim 14, wherein the operating cycle is controlled by a DC power timer and the operating cycle is 60 seconds or less.*

*19. The bromine producing method recited in claim 18, wherein the first time period of the operating cycle comprises a portion of up to 90% of the operating cycle.*

*20. The bromine producing method recited in claim 19, wherein the DC power timer is adjustable.*

*21. The bromine producing method recited in claim 14, wherein the polarity cycle is controlled by a polarity timer and the polarity is switched every 3 to 10 minutes.*

*22. The bromine producing method recited in claim 14, further comprising the steps of:*

*monitoring a bromine content of the brominated water; and*

*adjusting the operating cycle, the polarity cycle, and overriding period to supply brominated water with a desired bromine concentration to the body of water.*

*23. The bromine producing method recited in claim 22, further comprising the steps of:*

*monitoring a build-up of a deposit on the electrodes; and*

*adjusting the operating cycle, the polarity cycle, and overriding period to eliminate the build-up of the deposit on the electrodes.*

*24. A sanitizing electrode assembly apparatus for delivering brominated water to a body of water, the assembly comprising:*

*a canister having an inlet for an aqueous bromide electrolyte and an outlet for brominated water;*

*an anode and a cathode positioned in the canister in spaced apart relationship between the canister inlet and outlet;*

*means in electrical communication with the anode and the cathode for selectively transmitting a supplied direct current thereto for establishing a polarity for the anode and the cathode;*

*first control means for determining and establishing an operating cycle for the transmitting means, the operating cycle including a first time period during which the transmitting means is supplying direct current for producing brominated water and a second timer period during which the transmitting means is supplying no direct current; and*

*second control means for reversing the polarity of the anode and the cathode in a polarity cycle, the second control means including means for establishing a polarity cycle time and overriding means for selectively preventing the transmitting means from supplying direct current to the anode and the cathode prior to reversing the polarity of the anode and the cathode, and further for preventing buildup of unwanted deposits on the electrodes.*

*25. The assembly recited in claim 24, further comprising a bipolar electrode plate positioned in spaced-apart relationship between the anode and the cathode, and wherein the second control means further reverses the polarity for the bipolar plate.*

*26. The assembly recited in claim 25, wherein the bipolar electrode plate comprises a plurality of bipolar electrode plates positioned in spaced-apart relationship from each other.*

*27. The assembly recited in claim 26, wherein the anode, the cathode, and the bipolar electrode plates are positioned parallel to a flow of the electrolyte from the inlet, across the electrode plates, and out the outlet.*

*28. The assembly recited in claim 24, further comprising power supply means in electrical contact with the transmitting means for supplying direct current thereto.*

*29. The assembly recited in claim 24, wherein the first control means comprises a timer for establishing the operating cycle.*

*30. The assembly recited in claim 29, wherein the timer comprises an adjustable timer for establishing an adjustable first time period.*

*31. The assembly recited in claim 30, further comprising a bipolar electrode plate positioned in spaced-apart relationship between the anode and the cathode, and wherein the second control means further reverses the polarity for the bipolar plate.*

* * * * *